US009565983B2

United States Patent
Gu et al.

(10) Patent No.: US 9,565,983 B2
(45) Date of Patent: Feb. 14, 2017

(54) CYCLONIC SEPARATING DEVICE, CLEANER, SURFACE CLEANING APPARATUS AND CYCLONIC SEPARATING METHOD

(71) Applicants: JIANGSU MIDEA CLEANING APPLIANCES CO., LTD., Suzhou (CN); MIDEA GROUP CO., LTD., Beijiao (CN)

(72) Inventors: Youwei Gu, Suzhou (CN); Junying Niu, Suzhou (CN)

(73) Assignees: JIANGSU MIDEA CLEANING APPLIANCES CO., LTD., Suzhou (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 14/770,713

(22) PCT Filed: Sep. 22, 2014

(86) PCT No.: PCT/CN2014/087056
§ 371 (c)(1),
(2) Date: Aug. 26, 2015

(87) PCT Pub. No.: WO2015/180319
PCT Pub. Date: Dec. 3, 2015

(65) Prior Publication Data
US 2016/0143498 A1 May 26, 2016

(30) Foreign Application Priority Data

May 26, 2014 (CN) .......................... 2014 1 0226417
Jul. 4, 2014 (CN) .......................... 2014 1 0316915
(Continued)

(51) Int. Cl.
*B01D 45/12* (2006.01)
*A47L 9/16* (2006.01)
(Continued)

(52) U.S. Cl.
CPC .............. *A47L 9/1616* (2013.01); *A47L 9/165* (2013.01); *A47L 9/1608* (2013.01); *A47L 9/1633* (2013.01);
(Continued)

(58) Field of Classification Search
CPC ...... A47L 9/1616; A47L 9/165; A47L 9/1608; B01D 45/16; B01D 50/002; B01D 45/12; B01D 45/08
See application file for complete search history.

(56) References Cited

U.S. PATENT DOCUMENTS 7,494,523 B2 * 2/2009 Oh ........................ A47L 9/1625
55/343
7,651,544 B1 * 1/2010 Fester ..................... A47L 9/122
55/343
(Continued)

FOREIGN PATENT DOCUMENTS

CN 1312049 9/2001
CN 1778248 5/2006
(Continued)

OTHER PUBLICATIONS

International Searching Authority, Written Opinion of the International Searching Authority for PCT/CN2014/087056 (Feb. 26, 2015).

*Primary Examiner* — Dung H Bui
(74) *Attorney, Agent, or Firm* — Hodgson Russ LLP

(57) ABSTRACT

A cyclonic separating device includes: a first cyclonic separator defining a first longitudinal axis; a plurality of second cyclonic separators located downstream of the first cyclonic
(Continued)

separator, arranged circumferentially around the first longitudinal axis in parallel, and integrally received in the first cyclonic separator; an inlet passage at least partially received in the first cyclonic separator; a guiding passage communicated with the inlet passage and the first cyclonic separator respectively, in which a fluid introduced through the inlet passage is tangentially guided into the first cyclonic separator by the guiding passage. In addition, a surface cleaning apparatus, a cleaner and a method for separating dust from a dust containing air using the cyclonic separating device are further provided.

20 Claims, 7 Drawing Sheets

(30) Foreign Application Priority Data

| Jul. 4, 2014 | (CN) | 2014 1 0318218 |
|---|---|---|
| Jul. 4, 2014 | (CN) | 2014 1 0318453 |
| Jul. 4, 2014 | (CN) | 2014 1 0318454 |

(51) Int. Cl.
  *B01D 45/16* (2006.01)
  *B01D 50/00* (2006.01)
  *B01D 45/08* (2006.01)

(52) U.S. Cl.
  CPC .............. *B01D 45/08* (2013.01); *B01D 45/12* (2013.01); *B01D 45/16* (2013.01); *B01D 50/002* (2013.01)

(56) References Cited

U.S. PATENT DOCUMENTS

| 9,016,480 | B2* | 4/2015 | Tandon | B01D 21/267 |
| | | | | 209/711 |
| 2003/0084537 | A1* | 5/2003 | Conrad | A47L 5/30 |
| | | | | 15/353 |
| 2004/0088956 | A1* | 5/2004 | Gammack | A47L 9/1625 |
| | | | | 55/346 |
| 2005/0251951 | A1* | 11/2005 | Oh | A47L 9/1625 |
| | | | | 15/353 |
| 2006/0137305 | A1 | 6/2006 | Jung | |
| 2006/0168923 | A1* | 8/2006 | Lee | A47L 9/122 |
| | | | | 55/345 |
| 2006/0254226 | A1* | 11/2006 | Jeon | A47L 9/1625 |
| | | | | 55/345 |
| 2007/0011997 | A1* | 1/2007 | Han | A47L 9/1641 |
| | | | | 55/337 |
| 2007/0079584 | A1* | 4/2007 | Kim | A47L 9/1625 |
| | | | | 55/345 |
| 2007/0079585 | A1* | 4/2007 | Oh | A47L 9/1625 |
| | | | | 55/345 |
| 2007/0214754 | A1* | 9/2007 | Kim | A47L 9/1608 |
| | | | | 55/345 |
| 2008/0184681 | A1* | 8/2008 | Oh | A47L 9/1625 |
| | | | | 55/345 |
| 2009/0113859 | A1* | 5/2009 | Oh | A47L 9/1625 |
| | | | | 55/337 |
| 2009/0229071 | A1* | 9/2009 | Fester | A47L 5/30 |
| | | | | 15/347 |
| 2010/0205916 | A1* | 8/2010 | Yoo | A47L 9/1608 |
| | | | | 55/318 |
| 2011/0061350 | A1 | 3/2011 | Park et al. | |
| 2013/0291334 | A1* | 11/2013 | Peng | A47L 9/1625 |
| | | | | 15/353 |
| 2016/0095483 | A1* | 4/2016 | Hyun | A47L 9/1641 |
| | | | | 15/353 |

FOREIGN PATENT DOCUMENTS

| CN | 1839738 | 10/2006 |
| CN | 1947643 | 4/2007 |
| CN | 1951307 | 4/2007 |
| CN | 1985748 | 6/2007 |
| CN | 101238964 | 8/2008 |
| CN | 102429612 | 5/2012 |
| WO | 2012129774 | 10/2012 |

* cited by examiner

CYCLONIC SEPARATING DEVICE, CLEANER, SURFACE CLEANING APPARATUS AND CYCLONIC SEPARATING METHOD

CROSS-REFERENCE TO RELATED APPLICATION

This application is a National Stage application of International patent application PCT/CN2014/087056, filed Sep. 22, 2014, which claims the benefit of and priority to Chinese Patent Application No. 201410226417.X filed May 26, 2014, Chinese Patent Application No. 201410318454.3 filed Jul. 4, 2014, Chinese Patent Application No. 201410318453.9 filed Jul. 4, 2014, Chinese Patent Application No. 201410316915.3 filed Jul. 4, 2014, and Chinese Patent Application No. 201410318218.1 filed Jul. 4, 2014, the disclosures of which are incorporated herein by reference in their entirety.

FIELD

The present disclosure relates to the field of cleaning, and more particularly to a cyclonic separating device, a cleaner and a surface cleaning apparatus, as well as a method for separating dust from a dust containing air using the cyclonic separating device.

BACKGROUND

Chinese patent ZL01807570.3 discloses an apparatus for separating particles from a fluid stream. Specifically, as shown in FIG. 1, the apparatus includes one upstream cyclonic separating device 10' and a plurality of downstream cyclonic separating devices 20' arranged in parallel with each other, and each downstream cyclonic separating device 20' is at least partially extended into an interior of the upstream cyclonic separating device 10'. The apparatus for separating particles from the fluid stream generally has a large height, a large volume, and a low separation efficiency.

SUMMARY

Embodiments of the present disclosure seek to solve at least one of the problems existing in the related art to at least some extent.

In this connection, the present disclosure provides a cyclonic separating device, which is simple to assemble, convenient to replace, and high in separation efficiency.

Furthermore, the present disclosure needs to provide a cleaner having the cyclonic separating device.

Further, the present disclosure needs to provide a surface cleaning apparatus having an improved dust collecting space.

Still further, the present disclosure needs to provide a method for separating dust from a dust containing air using the cyclonic separating device, which has high separation efficiency.

A cyclonic separating device according to a first aspect of the present disclosure includes: a first cyclonic separator defining a first longitudinal axis; a plurality of second cyclonic separators located downstream of the first cyclonic separator, arranged circumferentially around the first longitudinal axis in parallel, and integrally received in the first cyclonic separator; an inlet passage at least partially received in the first cyclonic separator; a guiding passage communicated with the inlet passage and the first cyclonic separator respectively, in which a fluid introduced through the inlet passage is tangentially guided into the first cyclonic separator by the guiding passage.

With the cyclonic separating device according to embodiments of the present disclosure, since the plurality of second cyclonic separators are integrally received in the first cyclonic separator and the height of the cyclonic separating device only corresponds to the height of the first cyclonic separator, the overall height of the cyclonic separating device may be reduced, thus reducing the volume of the surface cleaning apparatus.

In addition, since the plurality of second cyclonic separators in parallel are located in the first cyclonic separator, for example, the height of the entire dust barrel may be made use of to perform the primary separation of the fluid sufficiently, thus enhancing the separation efficiency of dust.

In addition, the cyclonic separating device according to the above embodiment of the present disclosure may also have the following additional technical features.

In an embodiment, a fluid outlet of the guiding passage is disposed between two adjacent second cyclonic separators.

In an embodiment, a portion of the inlet passage received in the first cyclonic separator is extended along the first longitudinal axis.

In an embodiment, the fluid outlet is configured such that the fluid tangentially flows into the first cyclonic separator in a plane perpendicular to the first longitudinal axis.

In an embodiment, a projection of the guiding passage in the plane perpendicular to the first longitudinal axis is substantially helical or arc-shaped.

In an embodiment, at least one of the plurality of second cyclonic separators defines a second longitudinal axis parallel to the first longitudinal axis.

In an embodiment, the cyclonic separating device further includes: a dust collecting space surrounding a periphery of the inlet passage, and communicated with the plurality of second cyclonic separators respectively to collect dust separated by the plurality of second cyclonic separators.

In an embodiment, a central axis of the dust collecting space coincides with the first longitudinal axis.

In an embodiment, the cyclonic separating device further includes: a filtering member connected between adjacent second cyclonic separators, in which the fluid from which the dust has been separated by the first cyclonic separator tangentially flows into the second cyclonic separator via the filtering member.

In an embodiment, the filtering member and the adjacent second cyclonic separators are formed integrally.

In an embodiment, a central axis of the filtering member coincides with the first longitudinal axis, and a projection region of at least one of the plurality of second cyclonic separators in a plane perpendicular to the first longitudinal axis is protruded beyond a projection region of the filtering member in the plane perpendicular to the first longitudinal axis.

In an embodiment, a circumferential flanged edge is formed at a lower part of the filtering member, extended into the first cyclonic separator and inclined downwardly.

A surface cleaning apparatus according to a second aspect of the present disclosure includes: a dust barrel defining an opening in an upper end thereof and an air intake therein; a cyclonic separating device disposed in the dust barrel, and including: a first cyclonic separator defining a first longitudinal axis, a portion of the first cyclonic separator being constituted by an inner wall of the dust barrel; a plurality of second cyclonic separators located downstream of the first cyclonic separator, arranged circumferentially around the first longitudinal axis in parallel, and integrally received in the first cyclonic separator; an inlet passage communicated with the air intake and at least partially received in the first cyclonic separator; a guiding passage communicated with the inlet passage and the first cyclonic separator respectively, in which a fluid introduced through the inlet passage is tangentially guided into the first cyclonic separator by the guiding passage; and a dust collecting chamber located below the cyclonic separating device in the dust barrel to collect dust in the fluid separated by the cyclonic separating device.

With the surface cleaning apparatus according to embodiments of the present disclosure, since the plurality of second cyclonic separators are integrally received in the first cyclonic separator and the height of the cyclonic separating device only corresponds to the height of the first cyclonic separator, the overall height of the cyclonic separating device may be reduced, thus reducing the volume of the surface cleaning apparatus.

In addition, since the plurality of second cyclonic separators in parallel are located in the first cyclonic separator, for example, the height of the entire dust barrel may be made use of to perform the primary separation of the fluid sufficiently, thus enhancing the separation efficiency of dust.

A method for separating dust from a dust containing air using the abovementioned cyclonic separating device according to a third aspect of the present disclosure includes steps of: introducing the dust containing air into the cyclonic separating device via the inlet passage; tangentially introducing the dust containing air into the first cyclonic separator for primary separation; tangentially introducing the dust containing air from which a dust has been separated primarily by the first cyclonic separator into the plurality of second cyclonic separators respectively for secondary separation; and introducing dust separated from the dust containing air into a dust collecting chamber located below the cyclonic separating device.

With the method for separating dust from a dust containing air using the cyclonic separating device according to the third aspect of the present disclosure, since the plurality of second cyclonic separators are integrally received in the first cyclonic separator, the overall height of the cyclonic separating device may be made full use of to perform the primary separation and secondary separation of the dust containing air, thus enhancing the separation efficiency of the cyclonic separating device.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
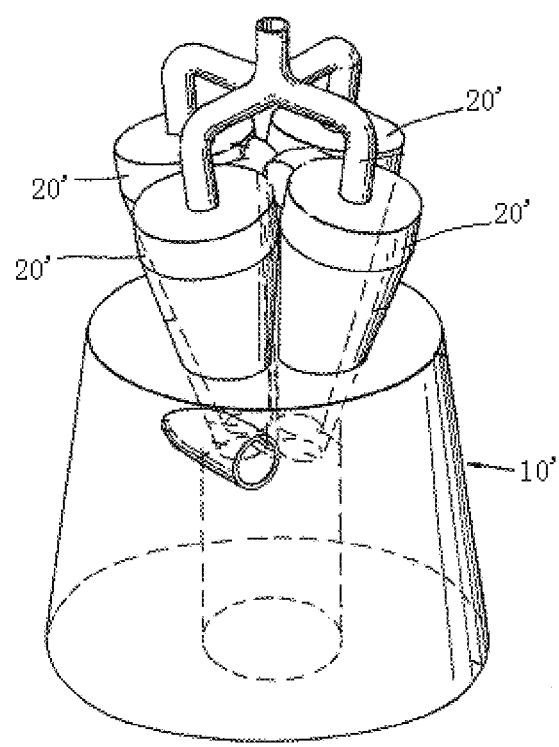
FIG. 1 is a schematic perspective view of a cyclone cleaner in the related art.

REFERENCE NUMERALS 100 surface cleaning apparatus;
A first cyclonic separating space;
B second cyclonic separating space;
10 dust barrel;
11 air intake;
12 barrel bottom;
13 barrel body;
101 opening;
20 cyclonic separating device;
201 first cyclonic separator;
202 second cyclonic separator;
203 inlet passage;
204 guiding passage;
2041 fluid outlet;
30 dust collecting chamber;
40 dust collecting space;
50 barrel cover;
51 through hole;
52 block piece;
53 air guiding member;
54 indentation;
60 filtering member;
61 hole;
70 circumferential flanged edge;
91 splitter;
92 air disturbing fin.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

The cyclonic separating device and the surface cleaning apparatus having the same according to embodiments of the present disclosure will be described below in detail with reference to FIGS. 2-6. FIGS. 2-6 show a part of a surface cleaning apparatus 100. For example, the surface cleaning apparatus 100 may be a cleaner, such as a vertical cleaner or a horizontal cleaner. In an embodiment, FIGS. 2-6 show a part of a dust barrel of a vertical cleaner.

Figure 2:
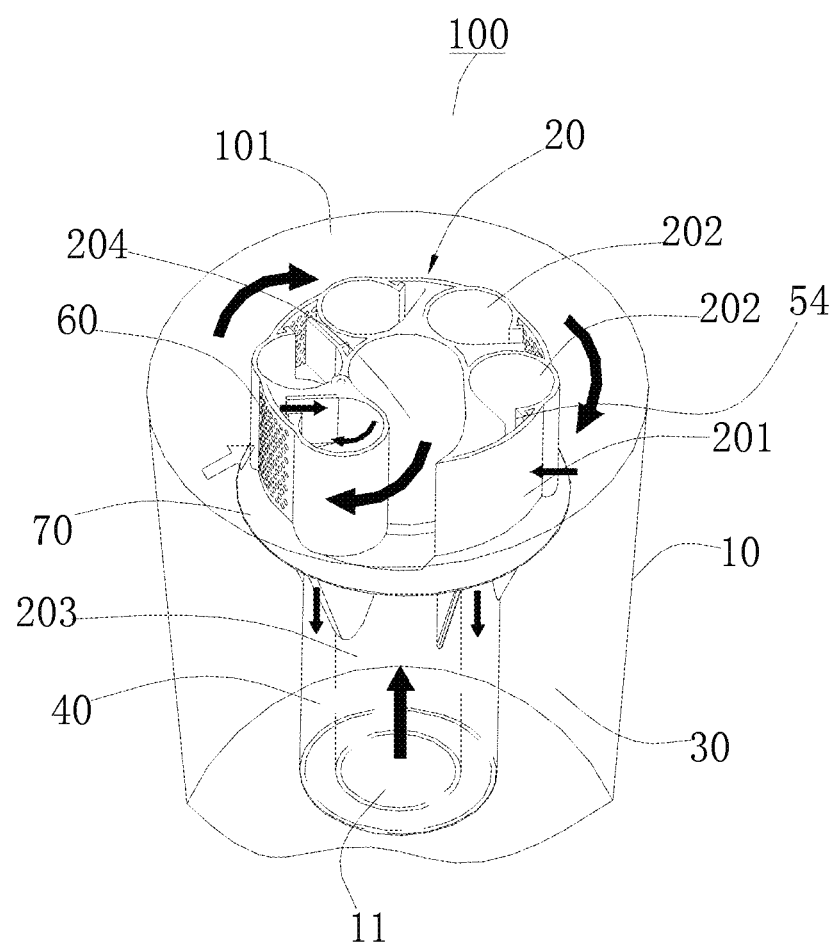
FIG. 2 is a schematic perspective view of a surface cleaning apparatus according to an embodiment of the present disclosure.
Figure 3:
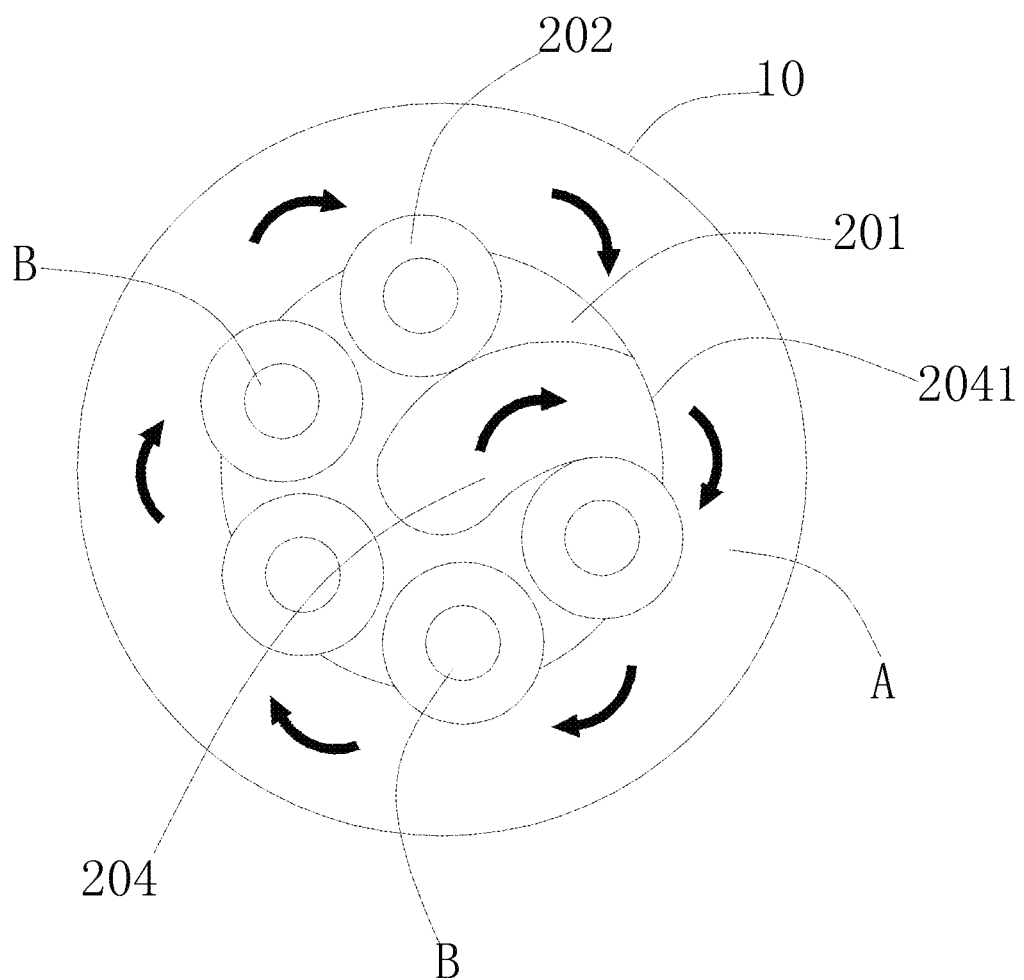
FIG. 3 is a top view of a surface cleaning apparatus according to an embodiment of the present disclosure.

As shown in FIGS. 2-3, the surface cleaning apparatus 100 may include a dust barrel 10, a cyclonic separating device 20, and a dust collecting chamber 30.

Specifically, the dust barrel 10 defining an opening 101 in an upper end thereof and an air intake 11 therein. A stream containing dust is introduced into the dust barrel 10 via the air intake 11, and then the dust is separated from the stream in the dust barrel 10. A barrel cover 50 may be disposed at the opening 101, through holes 51 are formed in the barrel cover 50, and the cleaned stream may be discharged from the through holes 51. The air intake 11 may be connected with a sucking component (not shown) of the surface cleaning apparatus 100. For example, the sucking component may be a floor brush assembly or a suction head of a cleaner.

The cyclonic separating device 20 according to an embodiment of the present disclosure will be illustrated below in detail. As shown in FIGS. 2-3, the cyclonic separating device 20 may include a first cyclonic separator 201, a plurality of second cyclonic separators 202, an inlet passage 203 and a guiding passage 204.

In one embodiment, the first cyclonic separator 201 may define a first longitudinal axis, and a portion of the first cyclonic separator 201 is constituted by an inner wall of the dust barrel 10, as shown in FIG. 3. In other words, as to the first cyclonic separator 201, a first cyclonic separating space A for cleaning and separating the stream needs to be configured in the dust barrel 10 with the aid of the inner wall of the dust barrel 10, and the first cyclonic separating space A may be used as a primary separation portion of the cyclonic separating device 20 for performing primary separation on the stream entering the cyclonic separating device 20, such that large particles or dust may be separated from the stream.

As shown in FIG. 2, the plurality of second cyclonic separators 202 are located downstream of the first cyclonic separator 201, arranged circumferentially around the first longitudinal axis in parallel, and integrally received in the first cyclonic separator 201.

The inlet passage 203 is at least partially received in the first cyclonic separator 201 and separated from the first cyclonic separator 201. The guiding passage 204 is communicated with the inlet passage 203 and the first cyclonic separator 201 respectively, and a fluid introduced through the inlet passage 203 is tangentially guided into the first cyclonic separator 201 by the guiding passage 204. The inlet passage 203 is communicated with the air intake 11. In other words, one end of the inlet passage 203 is communicated with the air intake 11, the other end of the inlet passage 203 is communicated with one end of the guiding passage 204, the other end of the inlet passage 203 is communicated with the first cyclonic separating space A, and the stream guided out of the guiding passage 204 enters into the first cyclonic separating space A in a tangential direction realizing the cleaning and separating in the first cyclonic separating space A.

In one embodiment, the dust collecting chamber 30 may be located below the cyclonic separating device 20 in the dust barrel 10 to collect dust in the fluid separated by the cyclonic separating device 20, as shown in FIG. 2. For example, the dust collecting chamber 30 may be used for collecting dust separated by the first cyclonic separator 201 and/or the second cyclonic separators 202.

It should be noted that the stream is introduced into the first cyclonic separating space A via the guiding passage 204. After the cleaning and separating are completed, the cleaned stream enters into the plurality of second cyclonic separators 202 for secondary cleaning and separating. After the secondary cleaning and separating is performed in the second cyclonic separators 202, the stream is discharged via the through holes 51.

Since the plurality of second cyclonic separators 202 are arranged circumferentially around the first longitudinal axis in parallel, the primarily cleaned stream may be dispersed and enters into the plurality of second cyclonic separators 202 in parallel, such that the cyclonic separating may be completed in the plurality of second cyclonic separators 202 respectively.

With the surface cleaning apparatus 100 according to embodiments of the present disclosure, since the plurality of second cyclonic separators 202 are integrally received in the first cyclonic separator 201 and the height of the cyclonic separating device 20 only corresponds to the height of the first cyclonic separator 201, the overall height of the cyclonic separating device 20 may be reduced, thus reducing the volume of the surface cleaning apparatus 100. In addition, since the plurality of second cyclonic separators 202 in parallel are located in the first cyclonic separator 201, for example, the height of the entire dust barrel may be made use of to perform the primary separation of the fluid sufficiently, thus enhancing the separation efficiency of dust.

It would be appreciated that in one embodiment, the inlet passage 203 and the second cyclonic separators 202 may be integrally molded, thus reducing the number of components of the surface cleaning apparatus 100 to be assembled, decreasing the number of times of opening a mould, and lowering the production cost.

As shown in FIGS. 2-3, in one embodiment, a fluid outlet 2041 of the guiding passage 204 is disposed between two adjacent second cyclonic separators 202, such that the stream may enter into the first cyclonic separating space A conveniently.

Figure 5:
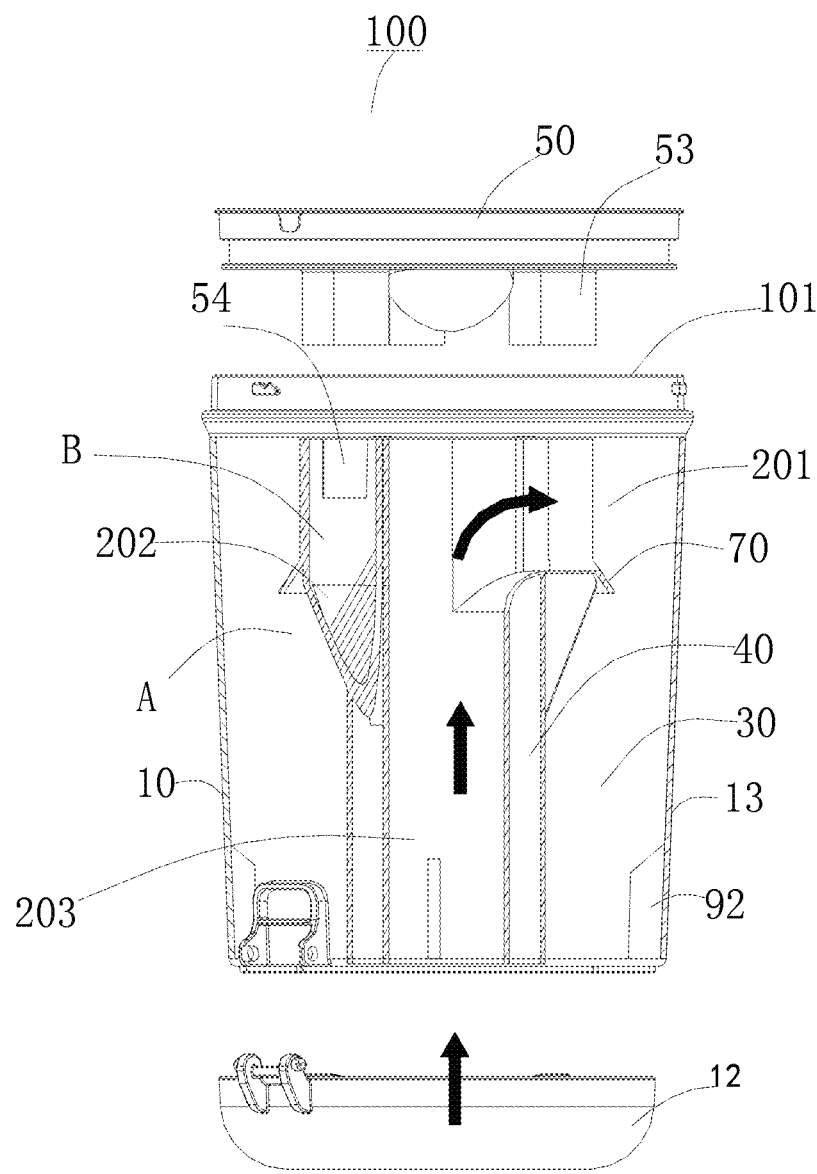
FIG. 5 is a schematic exploded view of a surface cleaning apparatus according to an embodiment of the present disclosure.

As shown in FIG. 2 and FIG. 5, in one embodiment, a portion of the inlet passage 203 received in the first cyclonic separator 201 is extended along the first longitudinal axis. Thus, it is possible to make rational use of a space in the first cyclonic separator 201, and to facilitate the arrangement of the plurality of second cyclonic separators 202.

Further, in one embodiment, the fluid outlet 2041 is configured such that the fluid tangentially flows into the first cyclonic separator 201 in a plane perpendicular to the first longitudinal axis. In other words, if the direction of the first longitudinal axis is an up-down direction, the fluid outlet 2041 is configured to be in a horizontal direction, and the stream enters into the first cyclonic separator 201 in the horizontal direction. Therefore, since the stream tangentially enters into the first cyclonic separator 201 and the fluid outlet 2041 is located between two adjacent second cyclonic separators 202, the stream flowing upwardly from a bottom of the dust barrel may be sufficiently separated in a circumferential direction, and then enters into the second cyclonic separators 202 for cyclonic separating. In addition, a dust receiving space located in the bottom of the dust barrel may be significantly increased, and the dust receiving volume actually used by the inventors is increased by more than 70% compared to the volume of a conventional surface cleaning apparatus shown in e.g., FIG. 1.

Further, a projection of the guiding passage 204 in the plane perpendicular to the first longitudinal axis is substantially helical or arc-shaped. Therefore, the fluid outlet 2041 is conveniently configured such that the fluid tangentially is introduced into the first cyclonic separator 201 in the tangential direction. Still further, in one embodiment, at least one of the plurality of second cyclonic separators 202 defines a second longitudinal axis parallel to the first longitudinal axis.

Figure 6:
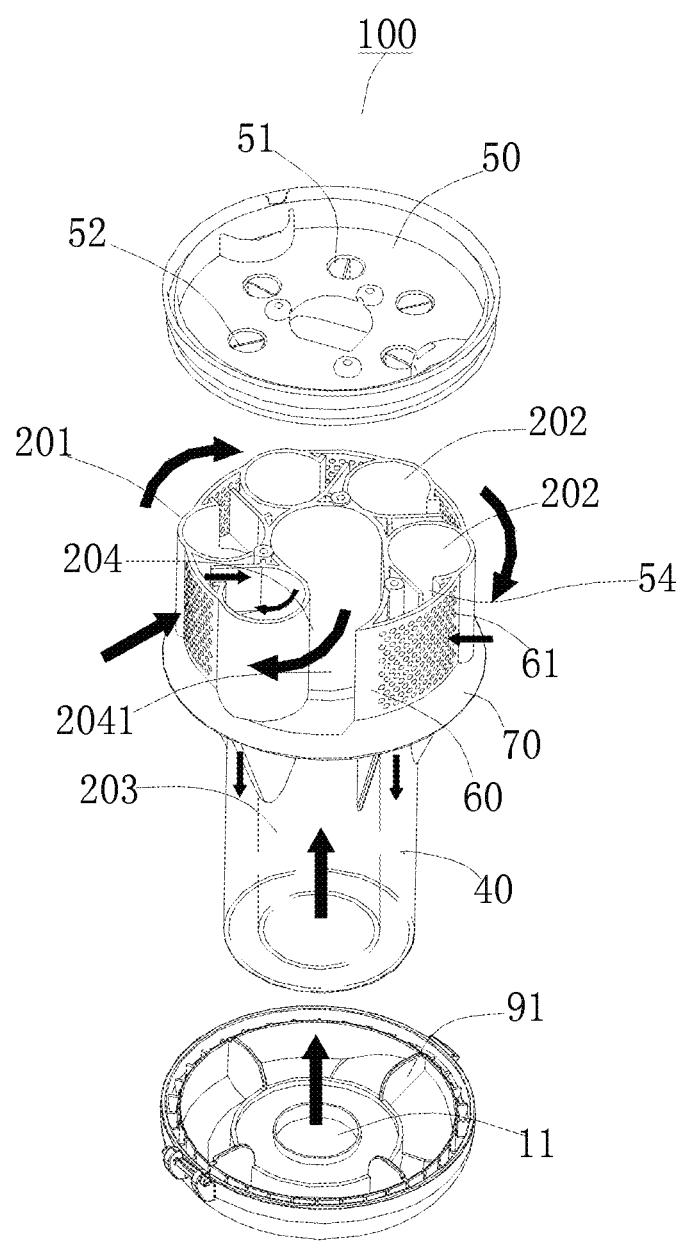
FIG. 6 is a schematic view of a surface cleaning apparatus without a barrel body according to an embodiment of the present disclosure.

As shown in FIGS. 2, 5-6, in one embodiment, the surface cleaning apparatus 100 further includes a dust collecting space 40 surrounding a periphery of the inlet passage 203, and communicated with the plurality of second cyclonic separators 202 respectively to collect dust separated by the plurality of second cyclonic separators 202. The dust collecting space 40 may be formed in an interior of the dust barrel 10, and located in a circular space in the dust collecting chamber 30. The dust collecting space 40 may be used for collecting dust separated by the plurality of second cyclonic separators 202 arranged circumferentially. It would be appreciated that the dust collecting space 40 may be defined by an annular portion at a lower part of the first cyclonic separator 201 and the inlet passage 203 which are molded integrally.

As shown in FIG. 2 and FIG. 6, in one embodiment, the surface cleaning apparatus 100 may further include a filtering member 60. The filtering member 60 is connected between adjacent second cyclonic separators 202, in which the fluid from which the dust has been separated by the first cyclonic separator 201 tangentially flows into the second cyclonic separator 202 via the filtering member 60, as shown in FIG. 6. A plurality of holes 61 disposed correspondingly to inlets of the plurality of second cyclonic separators 202 are formed in the filtering member 60. Thus, by providing the filtering member 60, it is possible to prevent large dust from entering into the second cyclonic separator 202 via the inlet of the second cyclonic separator 202 directly, and to separate the large dust in the first cyclonic separating space A and introduce the large dust in the dust collecting chamber 30. Further, in one embodiment, the filtering member 60 and the adjacent second cyclonic separators 202 are formed integrally, thus reducing the number of times of opening the mould and the assembly cost.

As shown in FIG. 2, in one embodiment, a central axis of the filtering member 60 coincides with the first longitudinal axis, and a projection region of at least one of the plurality of second cyclonic separators 202 in a plane perpendicular to the first longitudinal axis is protruded beyond a projection region of the filtering member 60 in the plane perpendicular to the first longitudinal axis. In other words, the filtering member 60 connected between two second cyclonic separators 202 may be arc-shaped, and an outer end of the filtering member 60 may be located within outer ends of two adjacent second cyclonic separators 202.

Figure 4:
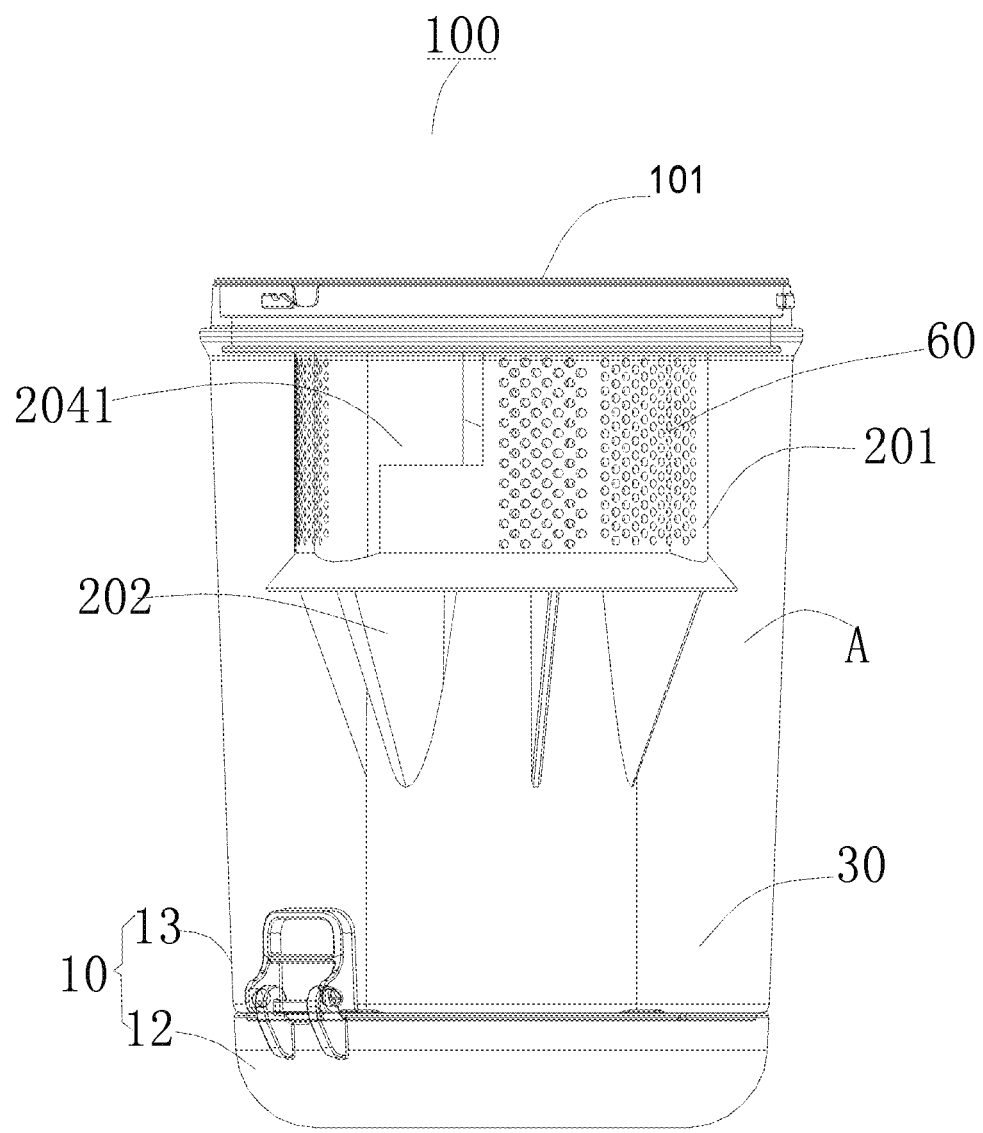
FIG. 4 is a schematic view of a surface cleaning apparatus according to an embodiment of the present disclosure.

As shown in FIGS. 4-6, in one embodiment, a circumferential flanged edge 70 is formed at a lower part of the filtering member 60, extended into the first cyclonic separator 201 and inclined downwardly. Thus, the circumferential flanged edge 70 may prevent dust separated by the first cyclonic separator 201 from rising. In one embodiment, at least one of the plurality of second cyclonic separators 202 defines the second longitudinal axis parallel to the first longitudinal axis. In other words, the plurality of second cyclonic separators 202 and the first cyclonic separator 201 may be disposed in parallel with each other, thus enhancing the separation efficiency of the cyclonic separating device 20.

As shown in FIGS. 4-6, in one embodiment, the dust barrel 10 may include a barrel bottom 12 and a barrel body 13. Specifically, the air intake 11 is formed at a central position of the barrel bottom 12 of the dust barrel 10, and the inlet passage 203 is communicated with the air intake 11. The barrel body 13 is detachably connected to the barrel bottom 12. Thus, the dust barrel 10 may be convenient to disassemble and assemble, and convenient to use.

As shown in FIGS. 5-6, in one embodiment, the surface cleaning apparatus 100 may further include a barrel cover 50. The barrel cover 50 is disposed at an upper end of the dust barrel 10 to close the opening 101, through holes 51 communicated with the plurality of second cyclonic separators 202 (e.g., communicated with air outlets of the second cyclonic separators 202) are formed in the barrel cover 50 to discharge the fluid from which the dust has been separated by the plurality of second cyclonic separators 202. Further, in one embodiment, a block piece 52 is disposed in the through hole 50, and is parallel to the first longitudinal axis. Thus, the block piece 52 may perform a certain guidance function to guide the stream blown out from the outlet of the second cyclonic separator 202 to discharge upwardly, such that the cleaned stream may be discharged more stably.

As shown in FIGS. 5-6, in one embodiment, an air guiding member 53 is disposed at a side of the barrel cover 50 facing the opening 101, is snap-fitted with an indentation 54 of the second cyclonic separator 202 facing the barrel cover 50, and forms an air inlet of the second cyclonic separator 202. Since the air guiding member 53 is snap-fitted with the second cyclonic separator 202, by means of the snap-fitting between the air guiding member 53 on the barrel cover 50 and the indentation 54 of the second cyclonic separator 202, the cyclonic separating device 20 may be positioned in the dust barrel 10, thus enhancing the stability of the surface cleaning apparatus 100 in use.

As shown in FIG. 6, in one embodiment, a plurality of splitters 91 are formed on the barrel bottom 12, and radially extended toward the first longitudinal axis in a plane through which the first longitudinal axis penetrates. In other words, the splitters 91 are located in the plane through which the first longitudinal axis penetrates respectively. Thus, the splitters 91 may divide the bottom of the dust barrel 10 into a plurality of spaces spaced apart from each other, such that it is possible to prevent swirls from being generated at the bottom of the dust barrel 10, and to restrict dust within the plurality of spaces spaced apart from each other. Further, air disturbing fins 92 are formed on a portion of an inner side wall of the barrel body 13 adjacent to the barrel bottom 12, and extended toward the first longitudinal axis in the plane through which the first longitudinal axis penetrates, thus further preventing swirls from being generated at the bottom of the dust barrel 10.

The operation process of the surface cleaning apparatus 100 according to embodiments of the present disclosure will be simply described below with reference to the drawings, in which an arrow direction represents the direction of the stream.

As shown in FIGS. 2-3, the stream sucked by the surface cleaning apparatus 100 first enters into the inlet passage 203 via the air intake 11, and enters into the first cyclonic separating space A via the guiding passage 204. After the primary cleaning and separating of the stream are completed in the first cyclonic separating space A, the stream advances upwardly to the filtering member 60, passes through the filtering member 60 and enters into the plurality of second cyclonic separators 202 in the tangential direction. After the cleaning and separating of the stream are completed in the plurality of second cyclonic separators 202, the stream is discharged from the through holes 51 in the barrel cover 50. Dust separated by the first cyclonic separator 201 is stored in the dust collecting chamber 30, and dust separated by the second cyclonic separators 202 are stored in the dust collecting space 40.

As shown in FIGS. 2-6, the cyclonic separating device 20 according to embodiments of the present disclosure may be the cyclonic separating device of the surface cleaning apparatus 100 in the above embodiments.

The cyclonic separating structure of the cyclonic separating device 20 will be further described below in detail with reference to FIGS. 2-3 in view of spatial arrangement. As shown in FIGS. 2-3, the cyclonic separating device 20 according to embodiments of the present disclosure may include a first cyclonic separating space A, a plurality of second cyclonic separating spaces B, an inlet passage 203 and a guiding passage 204.

Specifically, the first cyclonic separating space A defines a first longitudinal axis. The plurality of second cyclonic separating spaces B are located downstream of the first cyclonic separating space A, arranged circumferentially around the first longitudinal axis in parallel, and integrally received in the first cyclonic separating space A. The inlet passage 203 is at least partially received in the first cyclonic separating space A. The guiding passage 204 is communicated with the inlet passage 203 and the first cyclonic separating space A respectively, and a fluid introduced through the inlet passage 203 is tangentially guided into the first cyclonic separating space A by the guiding passage 204.

With the cyclonic separating device 20 according to embodiments of the present disclosure, since the plurality of second cyclonic separating spaces B are integrally received in the first cyclonic separating space A and the height of the cyclonic separating device 20 only corresponds to the height of the first cyclonic separating space A, the overall height of the cyclonic separating device 20 may be reduced, thus reducing the volume of the surface cleaning apparatus. In addition, since the plurality of second cyclonic separating spaces B in parallel are located in the first cyclonic separating space A, for example, the height of the entire dust barrel 10 may be made use of to perform the primary separation of the fluid sufficiently, thus enhancing the separation efficiency of dust.

Since the plurality of second cyclonic separating spaces B are integrally received in the first cyclonic separating space A and the height of the cyclonic separating device 20 is only correlated to the height of the first cyclonic separating space A, the overall height of the cyclonic separating device 20 may be reduced, thus reducing the volume of the surface cleaning apparatus 100. Meanwhile, since the second cyclonic separating spaces B are located within the first cyclonic separating space A, the height of the second cyclonic separating spaces B may be increased, such that the cyclonic separating device 20 may have a higher separation efficiency, and the operation efficiency of the surface cleaning apparatus 100 may be improved.

As shown in FIGS. 2-3, in one embodiment, a fluid outlet 2041 of the guiding passage 204 is disposed between two adjacent second cyclonic separating spaces B, such that the stream may enter into the first cyclonic separating space A conveniently.

As shown in FIG. 2 and FIG. 5, in one embodiment, the inlet passage 203 is at least partially extended along the first longitudinal axis. Thus, it is possible to make rational use of a space in the first cyclonic separating space A, and to facilitate the arrangement of the plurality of second cyclonic separating spaces B. Further, in one embodiment, a projection of the guiding passage 204 in the plane perpendicular to the first longitudinal axis is substantially helical or arc-shaped. Thus, the fluid outlet 2041 may be conveniently configured such that the fluid flows into the first cyclonic separating space A in a tangential direction. Still further, in one embodiment, at least one of the plurality of second cyclonic separating spaces B defines a second longitudinal axis parallel to the first longitudinal axis.

As shown in FIG. 2 and FIG. 6, a filtering member 60 is connected between adjacent second cyclonic separating spaces B, the fluid from which the dust has been separated by the first cyclonic separating space A tangentially flows into the second cyclonic separating space B via the filtering member 60. A plurality of holes 61 disposed correspondingly to inlets of the plurality of second cyclonic separating spaces B are formed in the filtering member 60. Thus, by providing the filtering member 60, it is possible to prevent large dust from entering into the second cyclonic separating spaces B directly, and to separate the large dust in the first cyclonic separating space A and introduce the large dust in the dust collecting chamber 30.

As shown in FIG. 2, in one embodiment, a central axis of the filtering member 60 coincides with the first longitudinal axis, and a projection region of at least one of the plurality of second cyclonic separating spaces B in a plane perpendicular to the first longitudinal axis is protruded beyond a projection region of the filtering member 60 in the plane perpendicular to the first longitudinal axis. In other words, the filtering member 60 connected between two second cyclonic separating spaces B may be arc-shaped, and an outer end of the filtering member 60 may be located within outer ends of two adjacent second cyclonic separating spaces B.

Figure 7:
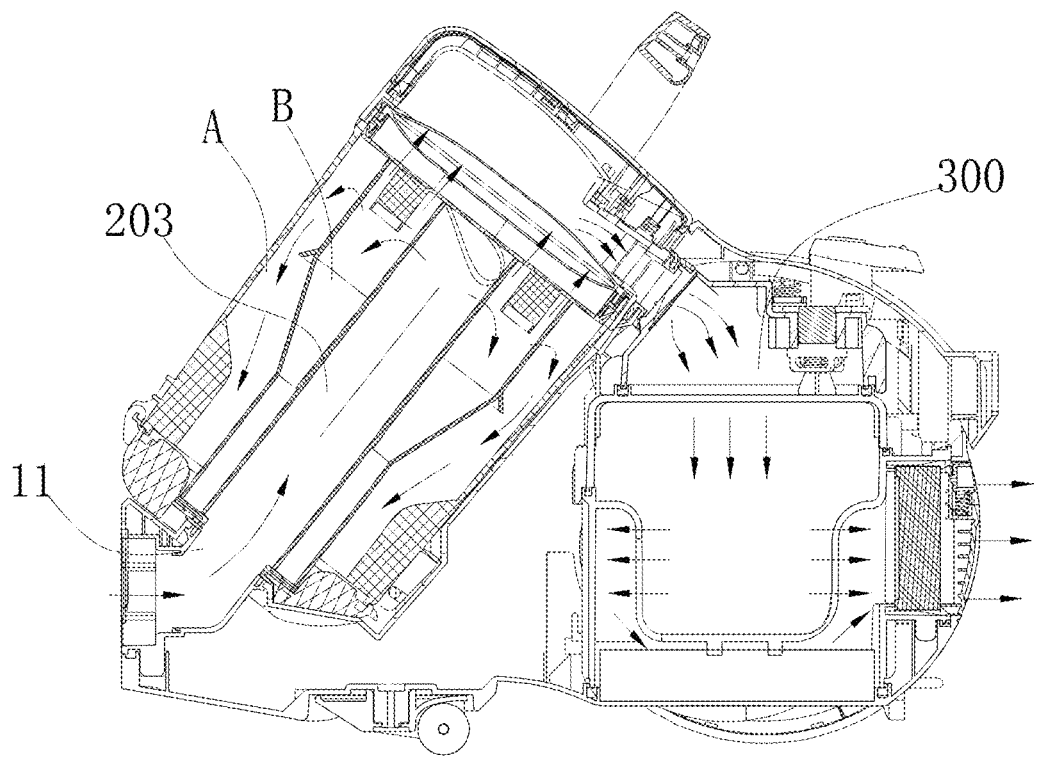
FIG. 7 is a schematic view of a surface cleaning apparatus according to an embodiment of the present disclosure, in which the surface cleaning apparatus is a horizontal cleaner.

As shown in FIG. 7, in one embodiment, the surface cleaning apparatus 100 is a horizontal cleaner, and arrows show an advance path of the stream. With the gradual decrease in the air pressure in a vacuum generating portion 300, the stream is sucked in via the air intake 11, passes through the inlet passage 203, and then enters into the first cyclonic separating space A for primary separation. The stream from which the dust has been separated enters into the second cyclonic separating spaces B for secondary separation, and the stream from which the dust has been secondarily separated enters into the vacuum generating portion 300 and then is discharged.

Figure 8:
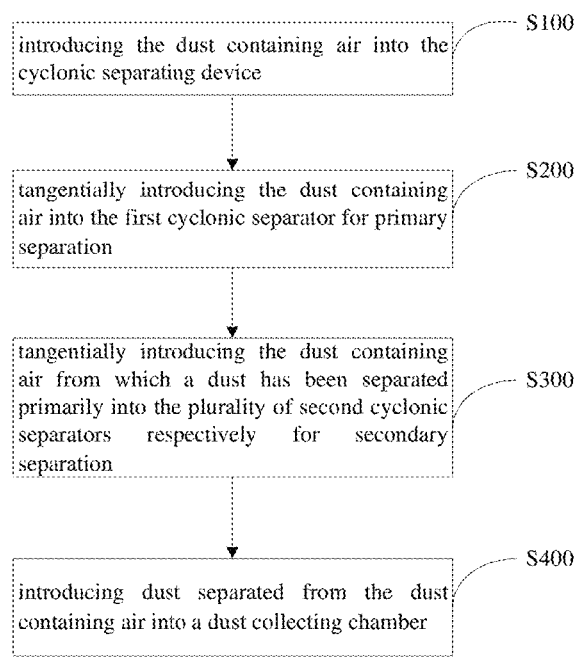
FIG. 8 is a schematic diagram of a method for separating dust from a dust containing air using a cyclonic separating device according to an embodiment of the present disclosure.

As shown in FIG. 8, based on the abovementioned cyclonic separating device, the method for separating dust from a dust containing air using the abovementioned cyclonic separating device according to embodiments of the present disclosure further has the following separation steps of: introducing the dust containing air into the cyclonic separating device via the inlet passage (S100); tangentially introducing the dust containing air into the first cyclonic separator for primary separation (S200); tangentially introducing the dust containing air from which a dust has been separated primarily by the first cyclonic separator into the plurality of second cyclonic separators respectively for secondary separation (S300); and introducing dust separated from the dust containing air into a dust collecting chamber located below the cyclonic separating device (S400).

It should be noted that the stream is introduced into the first cyclonic separating space A via the guiding passage 204. After the cleaning and separating are completed, the cleaned stream enters into the plurality of second cyclonic separators 202 for secondary cleaning and separating. After the secondary cleaning and separating is performed in the second cyclonic separators 202, the stream is discharged via the through holes 51.

Since the plurality of second cyclonic separators 202 are arranged circumferentially around the first longitudinal axis in parallel, the primarily cleaned stream may be dispersed and enters into the plurality of second cyclonic separators 202 in parallel, such that the cyclonic separating may be completed in the plurality of second cyclonic separators 202 respectively.

With the method for separating dust from a dust containing air using the cyclonic separating device according to embodiments of the present disclosure, since the plurality of second cyclonic separators are integrally received in the first cyclonic separator, the overall height of the cyclonic separating device may be made full use of to perform the primary separation and secondary separation of the dust containing air, thus enhancing the separation efficiency of the cyclonic separating device.

It should be noted that, in the above embodiments of the present disclosure, "stream" and "fluid" may be construed to be identical, for example, is an object containing dust to be cleaned and separated. Meanwhile, "fluid" may be construed broadly. In some embodiments, "fluid" may include an air flow. In some embodiments, "fluid" may include other flowable matters, such as a liquid or the like.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A cyclonic separating device, comprising:
a first cyclonic separator defining a first longitudinal axis, the first cyclonic separator having one or more walls defining an interior separating space;
a plurality of second cyclonic separators located downstream of the first cyclonic separator, arranged circumferentially around the first longitudinal axis in parallel, and integrally received in the first cyclonic separator such that the plurality of second cyclonic separators are located wholly within the interior separating space of the first cyclonic separator;
an air intake centrally located along the first longitudinal axis of the first cyclonic separator;
an inlet passage in fluid communication with the air intake and at least partially received in the first cyclonic separator;
a guiding passage communicated with the inlet passage and the first cyclonic separator respectively, wherein a fluid introduced through the inlet passage is tangentially guided outwardly into the interior separating space of the first cyclonic separator by the guiding passage;
wherein each of the plurality of second cyclonic separators has an air inlet formed on a side wall thereof, and the fluid is tangentially guided into the plurality of second cyclonic separators by the air inlet.

2. The cyclonic separating device according to claim 1, wherein a fluid outlet of the guiding passage is disposed between two adjacent second cyclonic separators.

3. The cyclonic separating device according to claim 1, wherein a portion of the inlet passage received in the first cyclonic separator is extended along the first longitudinal axis.

4. The cyclonic separating device according to claim 2, wherein the fluid outlet is configured such that the fluid tangentially flows into the first cyclonic separator in a plane perpendicular to the first longitudinal axis.

5. The cyclonic separating device according to claim 1, wherein a projection of the guiding passage in the plane perpendicular to the first longitudinal axis is substantially helical or arc-shaped.

6. The cyclonic separating device according to claim 1, wherein at least one of the plurality of second cyclonic separators defines a second longitudinal axis parallel to the first longitudinal axis.

7. The cyclonic separating device according to claim 3, further comprising:
a dust collecting space surrounding a periphery of the inlet passage, and communicated with the plurality of second cyclonic separators respectively to collect dust separated by the plurality of second cyclonic separators.

8. The cyclonic separating device according to claim 7, wherein a central axis of the dust collecting space coincides with the first longitudinal axis.

9. The cyclonic separating device according to claim 2, further comprising:
a filtering member connected between adjacent second cyclonic separators, wherein the fluid from which the dust has been separated by the first cyclonic separator tangentially flows into the second cyclonic separator via the filtering member.

10. The cyclonic separating device according to claim 9, wherein the filtering member and the adjacent second cyclonic separators are formed integrally.

11. The cyclonic separating device according to claim 10, wherein a central axis of the filtering member coincides with the first longitudinal axis, and a projection region of at least one of the plurality of second cyclonic separators in a plane perpendicular to the first longitudinal axis is protruded beyond a projection region of the filtering member in the plane perpendicular to the first longitudinal axis.

12. The cyclonic separating device according to claim 10, wherein a circumferential flanged edge is formed at a lower part of the filtering member, extended into the first cyclonic separator and inclined downwardly.

13. A cleaner, comprising a cyclonic separating device comprising:
a first cyclonic separator defining a first longitudinal axis, the first cyclonic separator having one or more walls defining an interior separating space;
a plurality of second cyclonic separators located downstream of the first cyclonic separator, arranged circumferentially around the first longitudinal axis in parallel, and integrally received in the first cyclonic separator, such that the plurality of second cyclonic separators are located wholly within the interior separating space of the first cyclonic separator;
an air intake centrally located along the first longitudinal axis of the first cyclonic separator;
an inlet passage in fluid communication with the air intake and at least partially received in the first cyclonic separator;
a guiding passage communicated with the inlet passage and the first cyclonic separator respectively, wherein a fluid introduced through the inlet passage is tangentially guided outwardly into the interior separating space of the first cyclonic separator by the guiding passage.

14. A surface cleaning apparatus, comprising:
a dust barrel defining an opening in an upper end thereof and an air intake therein;
a cyclonic separating device disposed in the dust barrel, and comprising:

a first cyclonic separator defining a first longitudinal axis, a portion of the first cyclonic separator being constituted by an inner wall of the dust barrel, the inner wall defining an interior separating space;
a plurality of second cyclonic separators located downstream of the first cyclonic separator, arranged circumferentially around the first longitudinal axis in parallel, and integrally received in the first cyclonic separator, such that the plurality of second cyclonic separators are located wholly within the interior separating space of the first cyclonic separator;
an inlet passage communicated with the air intake and at least partially received in the first cyclonic separator;
a guiding passage communicated with the inlet passage and the first cyclonic separator respectively, wherein a fluid introduced through the inlet passage is tangentially guided outwardly into the interior separating space of the first cyclonic separator by the guiding passage; and
a dust collecting chamber located below the cyclonic separating device in the dust barrel to collect dust in the fluid separated by the cyclonic separating device;
wherein the air intake is centrally located along the first longitudinal axis of the first cyclonic separator;
wherein each of the plurality of second cyclonic separators has an air inlet formed on a side wall thereof, and the fluid is tangentially guided into the plurality of second cyclonic separators by the air inlet.

15. The surface cleaning apparatus according to claim 14, wherein a fluid outlet of the guiding passage is disposed between two adjacent second cyclonic separators.

16. The surface cleaning apparatus according to claim 14, wherein a portion of the inlet passage received in the first cyclonic separator is extended along the first longitudinal axis.

17. The surface cleaning apparatus according to claim 15, wherein the fluid outlet is configured such that the fluid tangentially flows into the first cyclonic separator in a plane perpendicular to the first longitudinal axis.

18. The surface cleaning apparatus according to claim 14, wherein a projection of the guiding passage in the plane perpendicular to the first longitudinal axis is substantially helical or arc-shaped.

19. The surface cleaning apparatus according to claim 16, wherein at least one of the plurality of second cyclonic separators defines a second longitudinal axis parallel to the first longitudinal axis.

20. The surface cleaning apparatus according to claim 14, further comprising:
a dust collecting space surrounding a periphery of the inlet passage, and communicated with the plurality of second cyclonic separators respectively to collect dust separated by the plurality of second cyclonic separators.

* * * * *